Figure 3:
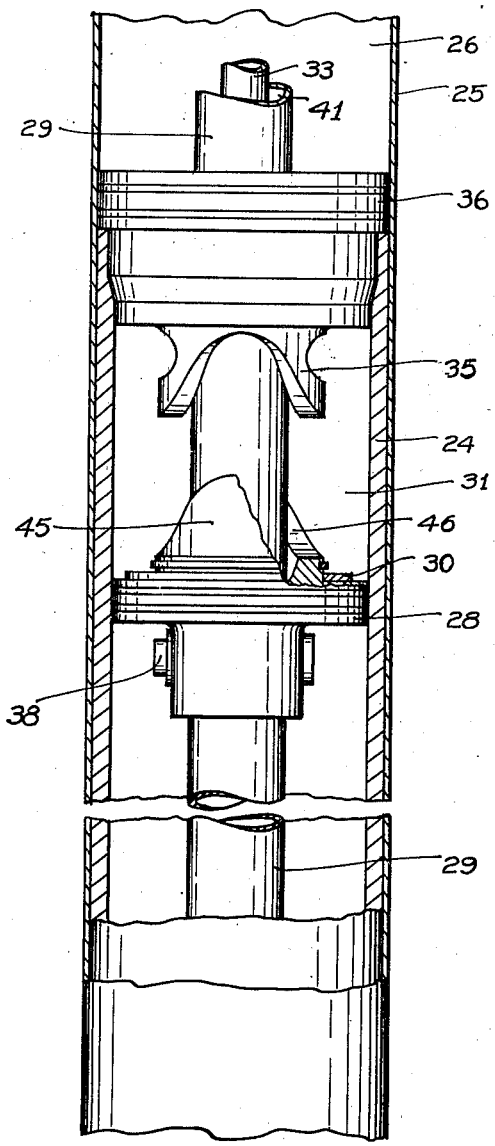

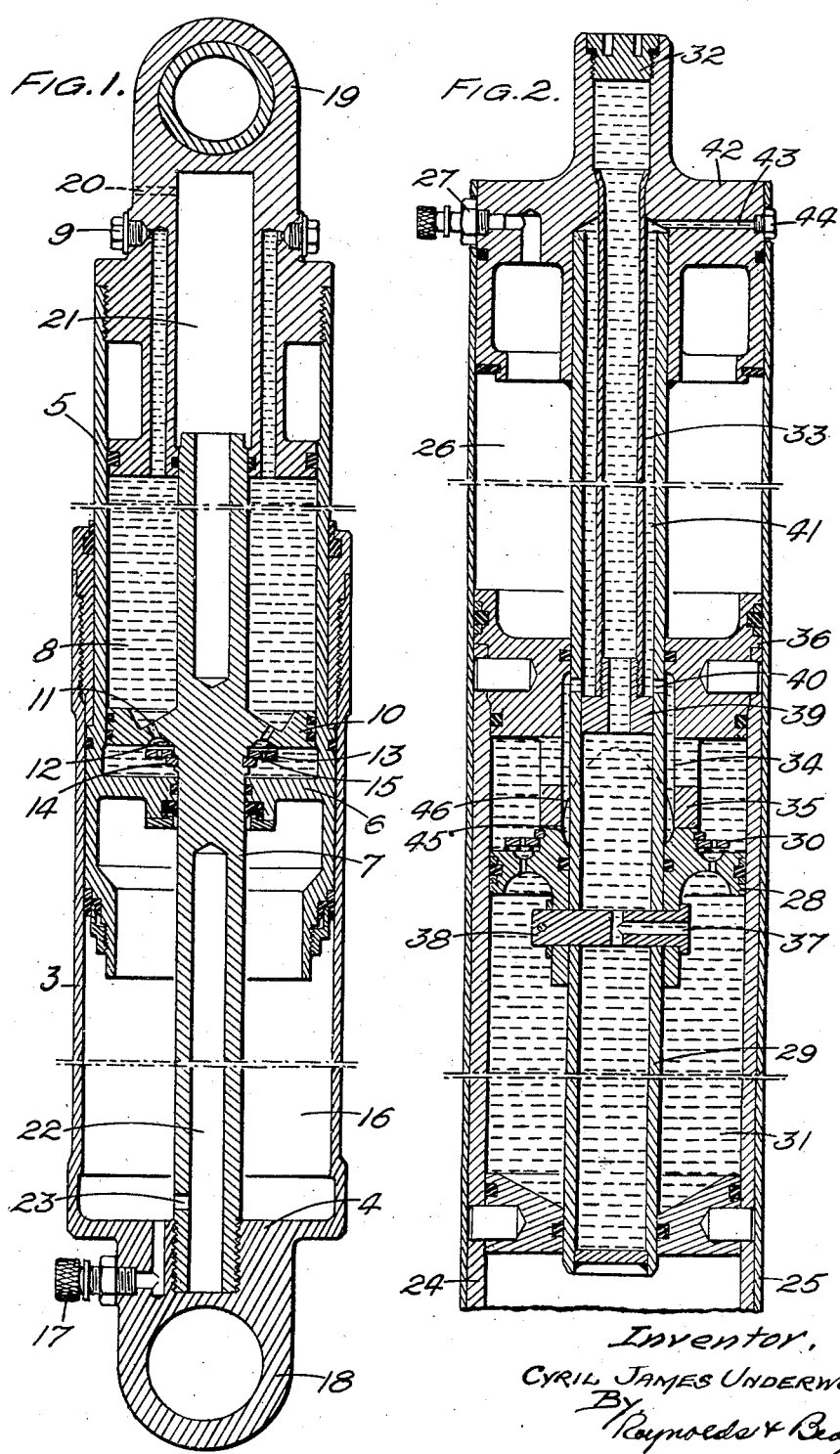

July 16, 1946.                C. J. UNDERWOOD                2,404,111
                         RESILIENT TELESCOPIC UNIT
                           Filed Nov. 23, 1943          2 Sheets-Sheet 2

INVENTOR.
CYRIL JAMES UNDERWOOD
BY
Reynolds & Beach
ATTORNEYS

Patented July 16, 1946

2,404,111

UNITED STATES PATENT OFFICE 2,404,111

RESILIENT TELESCOPIC UNIT

Cyril James Underwood, Cheltenham, England, assignor to Dowty Equipment Limited, Cheltenham, England Application November 23, 1943, Serial No. 511,466
In Great Britain November 17, 1942

1 Claim. (Cl. 267—64)

The present invention is a resilient device operating in compression and embodying unitarily and in tandem therewith a damping unit operable to restrain the resilient device against excessively violent operation.

It is an object of the invention to provide a damped resiliently-compressible shock-absorber in which the resilient stage of operation is effectively isolated from the damping unit; whereas the whole device is effectively embodied as a single unit complete in itself.

A further object of the invention is the provision of a telescopic resilient unit particularly effective for employment in vehicle and aircraft suspension systems, in which a resilient device operates in compression quite independently of a damping stage to restrain the plunger against excessively violent operation, especially in recoil.

Another object of the invention is the provision of a satisfactory shock-absorber in oleo-pneumatic form, in which complete separation of the compressed air or other gas which provides the resilience from the liquid which provides for damping action is effectively achieved without the necessity for incorporating a floating piston.

Yet a further object of the invention is the provision of an eminently practical form of damped resilient unit in which fluid damping action is provided for quite independently of resilient operation in compression, which may thus take any desired form at the designer's choice.

The manner of achievement of the above and other objects of the present invention will become apparent from the ensuing description and accompanying diagrammatic drawings, in which:

Figure 1 is a sectional side elevation of a damped resilient unit embodying the essential features of the present invention;

Figure 2 is a fragmentary sectional side elevation illustrating the invention as applied to a compression strut, such as may serve as a conventional shock strut to mount a castorable landing element (e. g. a tail landing element or the auxiliary landing element of a tricycle undercarriage); as the attachment of the landing element to the mounting and the landing element itself may be of any desired conventional form, the illustration and the ensuing relevant description are confined to the upper strut part in which the resilient unit and the damping unit operate.

Figure 3 is a detail axial section, with parts broken away, illustrating the realigning cams.

Referring now to Figure 1, the reference numeral 3 indicates the cylinder which is closed at its outer end, as indicated at 4. The other end of the cylinder is open and slidably receives the inner end of the hollow plunger 5. The hollow plunger 5 is closed at its outer end, and near its inner end has an annulus 6 which, extending as it does from the plunger into glanded sealing contact with the damping head mounting spindle 7, operates as a closure member to seal the space 8 within the hollow plunger 5 into which damping liquid is introduced through the filler plug 9. The damping head mounting spindle 7 extends as a member integral with the outer cylinder 3, or its closure plug 4, and fixedly mounts within the chamber 8 the damping head 10. The damping head 10 is a sliding piston fit in the bore of the hollow plunger 5 and operates to partition the space 8 into two compartments so that liquid flowing from one compartment to the other as the hollow plunger 5 moves into the outer cylinder 3 in closure under axial load must pass through the fluid-flow ports 11 provided through the damping head. The ports lead into the annular groove 12, and the clack valve washer 13 operates between the annulus 6 and the stop ring 14. The function of the clack valve 13 is to close against the face of the annulus 6 and confine flow of damping liquid to the greatly-restricted rate of flow provided for through the damping ports 15 under the influence of return flow of damping liquid through the damping head 10 in recoil movement of the shock-absorber on relief of axial load.

In oleo-pneumatic types of shock-absorber air or other gas at pressure is introduced into the inflation chamber 16 through the inflation valve 17, but a mechanical spring may operate in the chamber 16 alone or in conjunction with compressed gas.

Glanding is provided appropriately between the outer cylinder 3 and the hollow plunger 5; between the annulus 6 and the damping head mounting spindle 7; and between the damping head 10 and the bore of the hollow plunger 5.

A pin-joint connection 18 is provided at the outer end of the cylinder 3, and another, indicated by the reference numeral 19, is provided at the outer end of the hollow plunger 5 for connection of the unit between sprung and unsprung elements of a suspension system.

The air escape port, indicated in dotted lines by the reference numeral 20, can be provided if the damping head mounting spindle 7 is of such form that it blocks the inner end of the space 21, the port 20 then being desirable to maintain atmospheric pressure in the space 21. In preferred forms of the invention, however, the damping head mounting spindle 7 is preferably formed hollow as shown, the space 22 therein providing a continuation of the inflation chamber 16 in communication therewith through the port 23.

In operation of the unit shown in Figure 1, load operating axially in compression forces the hollow plunger 5 into the chamber 3, or vice versa, compressing the gas entrapped in the inflation chamber 16, already at considerable pressure, so that the gas operates resiliently to resist telescopic closure of the shock-absorber, and restores it by axial re-extension on relief of load. In closure the annulus 6 is moving away from the damping head 10 (or vice versa) and the clack valve washer 13 takes up the position shown in Figure 1, in which the ports 11 are unobstructed so that closure occurs substantially undamped and subject merely to resilient resistance. During recoil movement, however, there is mutual approach as between the annulus 6 and damping head 10 in consequence of which the prevailing fluid-flow causes the clack valve washer 13 to close against the groove 12, and by confining the flow of damping liquid to the flow restriction or damping ports 15 imposes an effective restriction on the rate of recoil.

In the construction shown with reference to Figure 2, the hollow plunger is constituted by the sleeve 24, which can be regarded as a tubular strut for mounting a landing element; whereas the tubular outer member 25 constitutes the part of the mounting which is connected to the aircraft. Compressed air in the space 26 operates to load the hollow plunger 24 downwardly in relation to the tubular outer element 25. Air or gas at pressure is introduced into the space 26 through the inflation valve 27; and for resilient shock-obsorption purposes and damping, the unit described with reference to Figure 2 operates in exactly the same way as that described with reference to Figure 1, the damping head 28 being mounted upon the damping head mounting spindle 29, which includes the recoil damping valve 30, also operating as described with reference to Figure 1.

The differences which Figure 2 introduces over and above the construction illustrated with reference to Figure 1 are that the damping head mounting spindle 29 of Figure 2 is essentially formed hollow, being closed at its inner end, and communicates with the space 31 for hydraulic damping liquid; and, additionally, provision is made, as hereinafter explained, to achieve a predetermined angular relationship of the plunger part 24 with respect to the outer tubular element 25 about the axis of the composite strut; which latter arrangement is particularly desirable where the strut is adapted as a mounting for a landing element which is required to be castorable or steerable, and which is to be brought into a predetermined position of alignment with respect to the aircraft in an unloaded condition, such as occurs when the aircraft becomes airborne.

The fact that the damping head mounting spindle 29 is essentially hollow and communicates with the liquid space 31, not only increases the amount of liquid available, and thus to some extent provides a reserve of liquid to keep the space 31 full, but also enables the liquid space 31 to be filled with liquid through a removable closure plug 32 at the upper end of the cylinder. In that respect it will be noted that liquid flowing into the filling orifice with the closure plug 32 removed flows down through the inner centre tube 33 to enter the space 31 through the ports 37 in the pin 38, which may be used to secure the damping head 28 to the spindle 29; access of liquid to the annular space 41 between the tube 33 and spindle 29 may be had through the piston's ports and then by way of ports 34 cut in the axial extension sleeve 35 of the plunger inner end closure plug 36. The inner centre tube 33 terminates inwardly in the enlarged head 39, above which ports, such as 40, establish communication between the liquid space 31 and the annular space 41 already referred to. The annular space 41 leads out through the inner end closure plug 42 of the outer tubular element by the port 43 to the bleeder plug 44. The bleeder plug to provide for escape of air and oil is removable for initial filling and subsequent topping-up operations.

In regard to the means for achieving a predetermined relative angular relationship as between the hollow plunger 24 and the tubular outer element 25 when there is no load operating in compression on the strut, reference has already been made to the axial extension 35 of the inner end closure plug 36. The inner end of that extension 35 takes the form of an edge cam, preferably profiled to achieve the required alignment. A complementary edge cam is constituted by an upwardly-directed axial extension 45 of the damping head 28. As shown in Figure 2, the strut can be regarded as fully extended, and the line representing the form of the edge cam as viewed in sectional elevation is seen indicated by the reference numeral 46.

As has already been indicated, the resilient operation and the damping operation of the unit described with reference to Figure 2 is precisely the same as already described with reference to Figure 1. In regard to the operation of the aligning cams, however, it should be obvious that load operating in compression on the strut raises the hollow plunger 24, and with it its inner end closure plug 36 and the axial extension 35 so that the cam surfaces at the line 46 are separated, the damping head 28 being fixed on its mounting spindle 29. Under load the strut part 24 is therefore free to turn with respect to the strut part 25 under steering or castoring influence, the edge cams merely operating to achieve the predetermined required alignment on relief of load resulting in reengagement of the edge cams.

From the foregoing description is will be readily apparent that the resilient means and the damping means are completely isolated from each other without necessity for providing the usual floating piston; while, furthermore, the resilient means and the damping means are entirely separate in their operation, damping action being the inevitable result of relative movement between the strut parts, which damping action moreover inevitably prevails throughout the whole of such relative movement. The arrangement can likewise provide the designer with choice of alternative resilient means.

What I claim is:

A telescopic resilient unit comprising a tubular outer element closed at one end; a hollow liquid-filled plunger slidably operating in said outer element to close its other end, and to define therein a closed compression chamber, tending to project the plunger outwardly; a spindle supported from said outer element and projecting axially through said plunger; a damping head fixed on said spindle and operating in the liquid which fills said plunger; valve means controlling movement of liquid between opposite faces of said damping head, disposed and arranged to permit substantially unimpeded relative movement of the plunger and outer element in the compressive sense, subject to pneumatic resistance in said compression chamber, and to damp hydraulically relative movement of the plunger and said outer element in the rebound sense only; and cooperating cam members, one fixed on the damping head and the other fixed to the hollow plunger, engageable as the parts return to extended position to dispose said plunger and said outer element in a predetermined relative angular setting about the unit's axis.

CYRIL JAMES UNDERWOOD.